United States Patent
Alberghetti et al.

(10) Patent No.: US 8,978,405 B2
(45) Date of Patent: Mar. 17, 2015

(54) FOOD COOLING APPLIANCE

(75) Inventors: Paolo Alberghetti, San Vendemiano (IT); Magnus Bergendahl, Göteborg (SE); Edi Fabbro, Betriolo (IT); Giancarlo Arrigoni, Udine (IT); Dario Muzzolini, Magnano in Riviera (IT); Ivan Muzzolini, legal representative, Magnano in Riviera (IT); Donatella Muzzolini, legal representative, Magnano in Riviera (IT); Marinella Valincich, legal representative, Magnano in Riviera (IT)

(73) Assignee: Electrolux Home Products Corporation N.V., Zaventem (BE)

( * ) Notice: Subject to any disclaimer, the term of this patent is extended or adjusted under 35 U.S.C. 154(b) by 1633 days.

(21) Appl. No.: 12/523,403

(22) PCT Filed: Dec. 13, 2007

(86) PCT No.: PCT/EP2007/010468
§ 371 (c)(1), (2), (4) Date: Feb. 22, 2011

(87) PCT Pub. No.: WO2008/089810
PCT Pub. Date: Jul. 31, 2008

(65) Prior Publication Data
US 2011/0203302 A1  Aug. 25, 2011

(30) Foreign Application Priority Data
Jan. 25, 2007 (EP) ................... 07101138

(51) Int. Cl.
*F25D 23/00* (2006.01)
*F25D 27/00* (2006.01)
(Continued)

(52) U.S. Cl.
CPC ............... *F25D 27/00* (2013.01); *F21V 23/02* (2013.01); *F21V 33/0044* (2013.01);
(Continued)

(58) Field of Classification Search
CPC ............ F25B 49/00; F25D 23/00; A47F 3/04
USPC .......... 62/264, 126, 244; 362/92, 31, 26, 133, 362/218, 222
See application file for complete search history.

(56) References Cited

U.S. PATENT DOCUMENTS 3,197,902 A  8/1965  Buzan
3,241,256 A  3/1966  Viret et al.
(Continued)

FOREIGN PATENT DOCUMENTS

CA  2471190  12/2004
CN  1576761  2/2005
(Continued)

OTHER PUBLICATIONS

International Search Report for PCT/EP2007/010468, dated Sep. 9, 2008, 1 page.

*Primary Examiner* — Frantz Jules
*Assistant Examiner* — Erik Mendoza-Wilkenfe
(74) *Attorney, Agent, or Firm* — Pearne & Gordon LLP

(57) ABSTRACT

There is described a food cooling appliance (1) having an outer casing (2) extending along a vertical reference axis (A); a food cooling chamber (3) housed inside the outer casing (2) and of a given length (L1) measured along the reference axis; at least one food-supporting shelf (5) positioned firmly, m but in easily removable manner, inside the cooling chamber; a primary inductor (8) extending in a direction parallel to the reference axis, and of a length (L2) substantially equal or less than the length of the cooling chamber; one or more light-emitting units (18) located along an outer peripheral edge of the shelf and coplanar with the shelf; and at least on secondary inductor (9) housed in the shelf to supply the light-emitting diodes (18) with electric current.

12 Claims, 2 Drawing Sheets

(51) Int. Cl.
*F21V 23/02* (2006.01)
*F21V 33/00* (2006.01)
*F25D 25/02* (2006.01)
*F21V 8/00* (2006.01)
*F21W 131/305* (2006.01)
*F21Y 101/02* (2006.01)

(52) U.S. Cl.
CPC ............. *F25D 25/02* (2013.01); *G02B 6/0021* (2013.01); *F21W 2131/305* (2013.01); *F21Y 2101/02* (2013.01); *F25D 2325/022* (2013.01)
USPC ................ 62/264; 62/259.1; 62/126; 362/92; 362/31; 362/26; 362/133; 362/218; 362/222

(56) References Cited

U.S. PATENT DOCUMENTS

| | | | |
|---|---|---|---|
| 3,263,063 A | 7/1966 | Marriott et al. | |
| 3,982,801 A | 9/1976 | Heidorn et al. | |
| 4,255,873 A | 3/1981 | Eberle | |
| 4,715,137 A | 12/1987 | Scheve | |
| 4,929,005 A * | 5/1990 | Heinen | 292/251.5 |
| 5,508,898 A | 4/1996 | McGovern | |
| 5,910,210 A | 6/1999 | Violi et al. | |
| 6,036,328 A | 3/2000 | Ohtsuki et al. | |
| 6,123,431 A | 9/2000 | Teragaki et al. | |
| 6,210,013 B1 | 4/2001 | Bousfield | |
| 6,283,612 B1 | 9/2001 | Hunter | |
| 6,619,814 B1 | 9/2003 | Hamada et al. | |
| 6,698,222 B2 * | 3/2004 | Sanna et al. | 62/229 |
| 6,813,896 B1 | 11/2004 | Janke et al. | |
| 7,107,779 B2 | 9/2006 | Avenwedde et al. | |
| 2002/0104325 A1 | 8/2002 | Mandel et al. | |
| 2004/0148949 A1 | 8/2004 | Parachini et al. | |
| 2004/0264160 A1* | 12/2004 | Bienick | 362/31 |
| 2005/0005618 A1 | 1/2005 | Neumann | |
| 2005/0081547 A1* | 4/2005 | Avenwedde et al. | 62/264 |
| 2005/0174804 A1 | 8/2005 | Blanc | |
| 2007/0127229 A1 | 6/2007 | Lee | |
| 2007/0139909 A1 | 6/2007 | Wing | |

FOREIGN PATENT DOCUMENTS

| | | |
|---|---|---|
| DE | 3542243 | 6/1987 |
| DE | 29814243 | 11/1998 |
| EP | 0462361 | 12/1991 |
| EP | 0549679 | 4/1992 |
| EP | 0934496 | 4/1998 |
| EP | 0934496 | 8/2000 |
| EP | 1222885 | 7/2002 |
| EP | 1468229 | 7/2003 |
| EP | 0971186 | 8/2003 |
| EP | 1491835 | 12/2004 |
| EP | 1909122 | 4/2008 |
| FR | 2544528 | 10/1984 |
| FR | 2730852 | 8/1996 |
| GB | 202161638 | 1/1986 |
| JP | 11-59953 | 11/1989 |
| JP | 9-303953 | 11/1997 |
| JP | 2000-177300 | 6/2000 |
| JP | 2000-258051 | 9/2000 |
| JP | 2001-501295 | 1/2001 |
| JP | 2001-050650 | 2/2001 |
| JP | 2001-263933 | 9/2001 |
| JP | 2002-524824 | 8/2002 |
| JP | 2005-019410 | 1/2005 |
| KR | 1993-22769 | 6/1995 |
| KR | 1995-49256 | 7/1997 |
| KR | 1997-33629 | 6/1999 |
| MX | 04006300 | 3/2005 |
| WO | 92/05535 | 4/1992 |
| WO | 9814740 | 4/1998 |
| WO | 9814740 A | 4/1998 |
| WO | 03062722 | 7/2003 |
| WO | 2004015327 A2 | 2/2004 |

* cited by examiner

FOOD COOLING APPLIANCE

The present invention relates to a food cooling appliance.

More specifically, the present invention relates to a food cooling appliance corresponding to an electric household appliance, such as a freezer or refrigerator, to which the following description refers purely by way of example.

As is known, currently marketed refrigerators are equipped with a lighting system for lighting the inside of the refrigerator cooling/storage compartment or chamber, to enable the user to see the food items arranged on the shelves normally housed inside the cooling/storage chamber.

Lighting systems of the above type normally comprise a number of lighting devices fixed inside the cooling chamber and powered by an external electric line over a number of electric wires connecting the external electric line to the lighting devices by means of a number of electric connectors inside the cooling chamber.

Lighting systems of the above type have the major drawback of being electrically unsafe when the cooling chamber is accessed by the user. That is, the electric connectors inside the cooling chamber are supplied permanently with operating voltage, which, also on account of the high level of humidity inside the cooling chamber, may result in current dispersion and, hence, the risk of indirect electric contact by the user inside the cooling chamber.

To eliminate the above drawback, refrigerators have been devised featuring a contactless lighting system, which supplies electric power to the lighting devices on the shelves by electromagnetic power transmission.

More specifically, U.S. Pat. No. 7,107,779 describes a refrigerator with a power system comprising a number of primary coils, which are spaced apart successively on a number of horizontal shelf supporting bars inside the cooling chamber to generate a number of magnetic fields at the ends of the bars; and a number of secondary coils, each located in a respective shelf and connected electrically to a relative lighting device.

In actual use, when the shelf is placed on a pair of horizontal supporting bars, with its secondary coil adjacent to the relative primary coil, current is induced in the secondary coil to power the lighting device in the shelf.

Though effective in terms of electrical safety and/or instilling a sense of electrical safety in the user, the refrigerator lighting system described in U.S. Pat. No. 7,107,779 has the major drawback of the position of the shelves inside the cooling chamber being dictated by the position of the primary coils.

That is, to supply the current necessary to operate the lighting device, the shelf must be positioned inside the cooling chamber in such a manner as to ensure correct magnetic coupling between the secondary coil and relative primary coil, so that the secondary coil is subjected to a sufficiently strong magnetic field.

To ensure correct positioning of the secondary coils with respect to the corresponding primary coils, and hence magnetic coupling as described above, the refrigerator described in U.S. Pat. No. 7,107,779 employs a mechanism for connecting the shelves to the supporting bars. That is, each shelf has a pair of projecting lateral pins, which, when the shelf is housed inside the refrigerator, fit inside two seats formed on the ends of the supporting bars, so as to align the secondary coil with the relative primary coil.

Besides employing a particularly user-awkward connecting mechanism, the above power system does not allow the shelf to be positioned inside the cooling chamber at any height with respect to the bottom wall of refrigerator. In fact, the shelf can only be positioned at certain predetermined heights, i.e. determined by location of the seats in the bars, where the secondary and primary coils are coupled magnetically.

Moreover, the supporting bars inside the cooling chamber are particularly user-awkward by reducing the available food storage space.

It is therefore an object of the present invention to provide a food cooling appliance, which ensures sufficient electrical safety for the user, while at the same time enabling the shelves to be positioned at any height inside the cooling chamber.

According to the present invention, there is provided a food cooling appliance as claimed in Claim 1, and preferably in any one of the following Claims depending directly or indirectly on Claim 1.

A non-limiting embodiment of the present invention will be described by way of example with reference to the accompanying drawings, in which.

Figure 1:
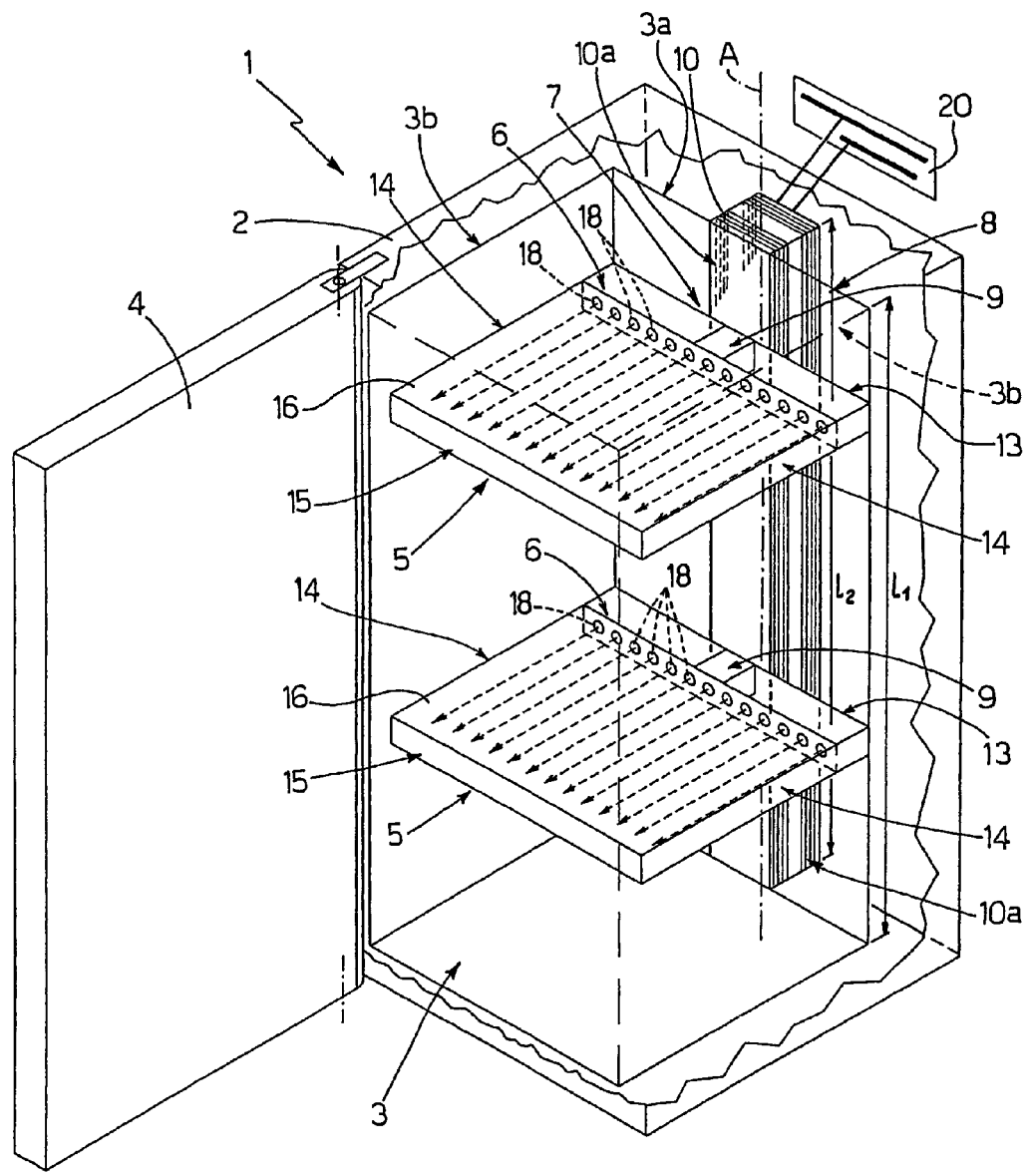
FIG. 1 shows a view in perspective of a food cooling appliance in accordance with the teachings of the present invention.
Figure 2:
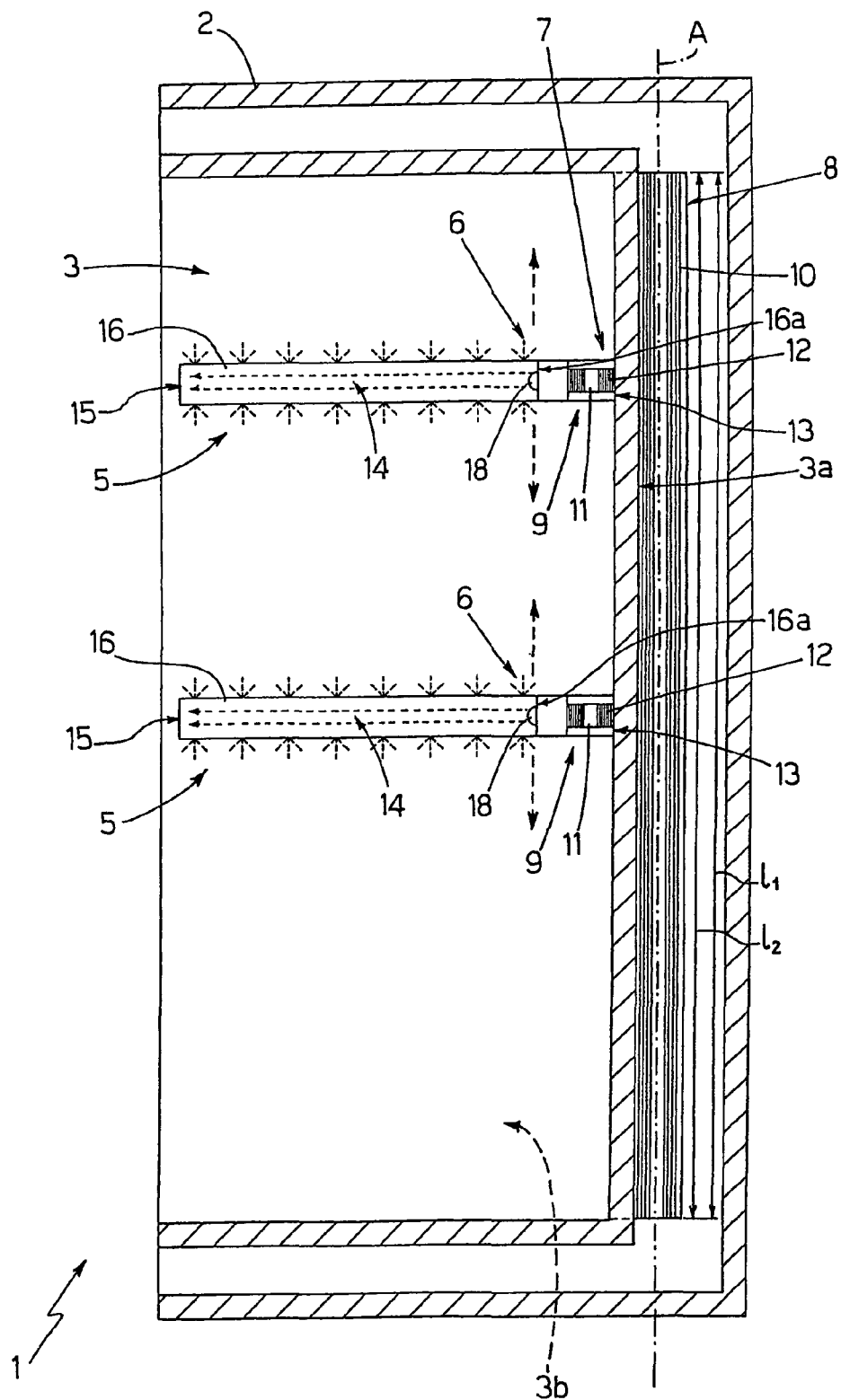
FIG. 2 shows a side view, with parts in section and parts removed for clarity, of the FIG. 1 cooling appliance.

With reference to FIGS. 1 and 2, number 1 indicates as a whole a food cooling appliance, particularly suitable for home use.

In the FIGS. 1 and 2 embodiment, cooling appliance 1 is a refrigerator, which substantially comprises a preferably, though not necessarily, parallelepiped-shaped outer casing 2 extending along a vertical reference axis A and resting on the floor; and at least one cooling chamber 3 located inside outer casing 2 and for housing food items for cooling.

Cooling appliance 1 also comprises a door 4 closing cooling chamber 3, and which is hinged to one side of outer casing 2, alongside the access opening to cooling chamber 3, to rotate, about an axis parallel to vertical reference axis A, to and from a position closing cooling chamber 3.

Cooling chamber 3 is preferably, though not necessarily, parallelepiped-shaped, and extends inside outer casing 2 to a predetermined length $l_1$, measured along vertical axis A.

In the FIGS. 1 and 2 example, cooling chamber 3 houses a number of food-supporting shelves 5, and substantially comprises a vertical rear wall 3a parallel to axis A and opposite the access opening to cooling chamber 3; and two opposite, parallel lateral walls 3b on opposite sides of rear wall 3a.

Shelves 5 are alternatively positionable firmly, but in easily removable manner, in a substantially horizontal position inside cooling chamber 3 in a plurality of consecutive operative positions vertically spaced inside said cooling chamber 3 to support the food items for cooling.

Cooling appliance 1 also comprises a lighting devices 6 incorporated in shelves 5 to light cooling chamber 3; and a contactless power system 7 for supplying the electric power necessary to operate each lighting devices 6 in shelves 5.

More specifically, unlike the contactless power systems of known cooling appliances, power system 7 of cooling appliance 1 substantially comprises a primary inductor 8 located adjacent to cooling chamber 3 to generate a magnetic field, and extending in a direction parallel to said vertical reference axis A to a predetermined length $l_2$ so as to be faced to the supporting shelf 5, when the supporting shelf 5 is located inside the cooling chamber 3 in at last two different operative positions.

More specifically, in the example shown, the primary inductor 8 extends parallel to vertical axis A to a length $l_2$ which is substantially equal to the vertical length $l_1$ of cooling chamber 3 so as to be faced to the supporting shelf 5, when the supporting shelf 5 is located inside the cooling chamber 3 in any operative positions.

It should be pointed out that the length $l_2$ of the primary inductor 8 could be less than the vertical length $l_1$ of cooling chamber 3 such that to be faced to the supporting shelf 5, when the supporting shelf 5 is located inside the cooling chamber 3 in a few consecutives operative positions.

Power system 7 also comprises, for each shelf 5, a secondary inductor 9 for supplying induced electric current to relative lighting device 6.

More specifically, the electric current circulating in secondary inductor 9 is induced in the secondary inductor 9 by the magnetic field generated by the elongate primary inductor 8, when shelf 5 is housed inside cooling chamber 3.

It should be pointed out that using a single primary inductor 8, extending vertically along the cooling chamber 3, has the advantage of generating a single elongate magnetic field; the magnetic flux lines of which travel along a path extending along the whole of cooling chamber 3, thus regardless of how the corresponding shelves 5 are positioned inside cooling chamber 3.

On the other words the elongate primary inductor 8, induces current in secondary inductors 9 such that the shelves 5 can be positioned in different operative position, and at any height inside the cooling chamber 3.

With reference to FIG. 2, primary inductor 8 is located inside the gap between vertical rear wall 3a of cooling chamber 3 and outer casing 2, and is connected to an electric power source outside cooling appliance 1, e.g. an electric line 20, to receive the current, preferably alternating current, necessary to generate the induction magnetic field.

More specifically, primary inductor 8 comprises at least one coil 10 located directly facing the outside of rear wall 3a of cooling chamber 3, and which comprises a number of windings or turns of conducting material.

More specifically, the winding or turns of coil 10 are wound to form a loop, which is substantially elongated in a predetermined direction parallel to vertical axis A. The loop formed by the turns of coil 10 has a length $l_2$, in the predetermined direction parallel to vertical axis A, substantially equal or less to the length $l_1$ of cooling chamber 3 measured along vertical axis A so as to be faced to the shelf 5 when the shelf 5 in located inside of the cooling chamber 3 in the operative positions.

In the example shown, the turns of coil 10 are wound into a loop, so that the two long sides 10a extend substantially parallel to axis A and cover a length substantially equal to the length $l_1$ of cooling chamber 3.

Each secondary inductor 9 preferably, though not necessarily, comprises a core 11 of ferromagnetic material housed inside shelf 5 so as to face primary inductor 8; and at least one coil 12 comprising a number of windings or turns of conducting material.

The windings or turns of coil 12 are preferably, though not necessarily, wound about core 11, and have terminals connected to lighting device 6 to supply the lighting device with the electric current induced in secondary inductor 9 by the magnetic field generated by primary inductor 8.

In the FIGS. 1 and 2 example, each shelf 5 comprises a rear edge 13 positioned facing rear wall 3a; two lateral edges 14 substantially perpendicular to rear edge 13 and positioned contacting lateral walls 3b; and a front edge 15 positioned facing the access opening to cooling chamber 3.

In the FIG. 1 example, secondary inductor 9 is located along rear edge 13 of shelf 5. More specifically, core 11 of secondary inductor 9 is located along rear edge 13 of shelf 5 so that, when shelf 5 is seated in the relative horizontal position inside cooling chamber 3 in any operative position, core 11 and, hence, the secondary coil 12 are substantially aligned with the main coil 10 so that the magnetic field generated by primary inductor 8 travels through them.

Lighting device 6 comprises a flat, substantially rectangular plate 16 positioned horizontally to define a front portion of shelf 5; and one or more light emitting units 18 located on a rear portion of shelf 5 so as to be positioned facing and parallel to a peripheral edge of flat plate 16.

More specifically, flat plate 16 may be made of glass and/or transparent or semitransparent plastic material capable of optically guiding and diffusing the light beams generated by light-emitting units 18 into cooling chamber 3.

In the FIGS. 1 and 2 example, the lighting device 6 comprises a number of light-emitting diodes 18 which are housed inside rear edge 13 of shelf 5 so as to be positioned facing and parallel to a peripheral edge 16a of plate 16, and to project the light beams through peripheral edge 16a of plate 16 and through plate 16 itself.

In the example shown, light-emitting diodes 18 are aligned successively in a direction parallel to and facing peripheral edge 16a of plate 16, so that the light beams generated by them travel through plate 16 in a direction substantially coplanar with plate 16, and are diffused from both the major surfaces of plate 16.

Cooling appliance 1 has the major advantage of enabling the shelves to be positioned at any height inside the cooling chamber, i.e. in any operative position, while at the same time providing for optimum light diffusion inside the cooling chamber, by using a row of light-emitting diodes along one edge of the plate.

Clearly, changes may be made to the cooling appliance as described and illustrated herein without, however, departing from the scope of the present invention as defined in the accompanying Claims.

The invention claimed is:

1. A food cooling appliance (1) comprising:
   an outer casing (2) extending along a substantially vertical reference axis (A);
   a food cooling chamber (3) housed inside said outer casing (2);
   at least one adjustable food-supporting shelf (5) removably positionable inside said cooling chamber (3) in a plurality of operative positions vertically spaced inside said cooling chamber (3);
   a primary inductor (8) located adjacent to said cooling chamber (3) and extending in a direction substantially parallel to said vertical reference axis (A) to a predetermined length (l2), said primary inductor (8) generating a single elongated magnetic field along a vertical length (l1) of the cooling chamber (3) so as to be faced to said food-supporting shelf (5) when the food-supporting shelf (5) is located inside said cooling chamber (3) at any of the plurality of operative positions;
   at least one light-emitting unit (18) located along an outer peripheral edge of said food-supporting shelf (5); and
   at least one secondary inductor (9) housed in said food-supporting shelf (5) to supply contactlessly said light-emitting unit (18) with electric current induced in the secondary inductor (9) by the magnetic field generated by said primary inductor (8), when said food-supporting shelf (5) is housed inside said cooling chamber (3) in any operative position along said predetermined length (l2) of said primary inductor (8), wherein the primary inductor (8) and the secondary inductor (9) are located on opposite sides of an inner wall of the cooling chamber (3) in a way that the primary inductor (8) and the secondary inductor (9) face each other.

2. An appliance as claimed in claim 1, wherein said cooling chamber (3) extending inside outer casing (2) to a predetermined length (11); said primary inductor (8) being of a length (12) substantially equal or less than said length (11) of said cooling chamber (3) so as to be faced to said food-supporting shelf (5) when the food-supporting shelf (5) is located inside said cooling chamber (3) in a number of different operative positions.

3. An appliance as claimed in claim 1, wherein said primary inductor (8) comprises at least one coil (10) having a number of turns wound to form a loop elongated in a direction parallel to said reference axis (A); said coil (10) being of a length (12) substantially equal or less than said length (11) of said cooling chamber (3).

4. An appliance as claimed in any one of claim 1, comprising a number of light-emitting diodes (18) located along an outer peripheral edge of said food-supporting shelf (5) and coplanar with the food-supporting shelf (5).

5. An appliance as claimed in claim 4, wherein said food-supporting shelf (5) is substantially rectangular, and comprises a rear peripheral edge (13) which is positioned facing said primary inductor (8) when the food-supporting shelf (5) is housed inside said cooling chamber (3); said light-emitting diodes (18) being housed in said food-supporting shelf (5) along said rear peripheral edge (13).

6. An appliance as claimed in claim 5, wherein said food-supporting shelf (5) comprises a flat plate (16), which is coplanar with the food-supporting shelf (5) and made of material capable of transmitting and/or diffusing light; said light-emitting diodes (18) being housed in said food-supporting shelf (5) so as to be parallel to and face a peripheral edge (16a) of said flat plate (16).

7. An appliance as claimed in claim 6, wherein the light-emitting diodes (18) are housed in said food-supporting shelf (5) so as to be parallel to and face a rear peripheral edge (16a) of said flat plate (16) facing said primary inductor (8).

8. An appliance as claimed in any one of claim 1, wherein said primary inductor (8) is interposed between said outer casing (2) and said cooling chamber (3).

9. An appliance as claimed in claim 8, wherein said cooling chamber (3) comprises a vertical rear wall (3a) opposite a door (4) closing said cooling chamber (3); said primary inductor (8) being interposed between said outer casing (2) and said vertical rear wall (3a), and outside said cooling chamber (3).

10. An appliance as claimed in any one of claim 1, wherein said secondary inductor (9) comprises at least one coil (12) having a number of turns.

11. An appliance as claimed in claim 10, wherein said secondary inductor (9) comprises at least one core of ferromagnetic material (11), about which the winding of said coil (12) are wound.

12. An appliance as claimed in claim 11, wherein said core (11) is housed in said food-supporting shelf (5) to face said primary inductor (8) when said food-supporting shelf (5) is housed in said predetermined position inside said cooling chamber (3).

* * * * *